United States Patent
Daita et al.

(10) Patent No.: US 7,967,329 B2
(45) Date of Patent: Jun. 28, 2011

(54) PROTECTIVE LAYER FOR AN AIRBAG ASSEMBLY

(75) Inventors: Vishwanath Daita, Farmington Hills, MI (US); Junko Pauken, Canton, MI (US); Sean B. West, Belleville, MI (US); Haoliang Michael Sun, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 12/476,549

(22) Filed: Jun. 2, 2009

(65) Prior Publication Data

US 2010/0301589 A1 Dec. 2, 2010

(51) Int. Cl.
*B60R 21/20* (2006.01)

(52) U.S. Cl. .................................... 280/728.3

(58) Field of Classification Search ............... 280/728.3
See application file for complete search history.

(56) References Cited

U.S. PATENT DOCUMENTS

| | | | |
|---|---|---|---|
| 5,242,192 A | 9/1993 | Prescaro et al. | |
| 5,342,088 A * | 8/1994 | Bauer | 280/728.3 |
| 5,447,329 A | 9/1995 | Hamada | |
| 5,588,674 A | 12/1996 | Yoshimura et al. | |
| 5,823,566 A | 10/1998 | Manire | |
| 6,131,944 A * | 10/2000 | Henkel et al. | 280/728.3 |
| 6,474,686 B1 | 11/2002 | Higuchi et al. | |
| 6,877,772 B2 | 4/2005 | Fischer et al. | |
| 6,942,243 B2 * | 9/2005 | Davis et al. | 280/728.3 |
| 2004/0160043 A1 | 8/2004 | Litjens et al. | |
| 2004/0183279 A1 * | 9/2004 | DePue et al. | 280/728.3 |

FOREIGN PATENT DOCUMENTS

| | | |
|---|---|---|
| DE | 10316272 A1 | 11/2004 |
| EP | 0963886 A2 | 12/1999 |

* cited by examiner

*Primary Examiner* — Faye M. Fleming
(74) *Attorney, Agent, or Firm* — Frank A. MacKenzie; Brooks Kushman P.C.

(57) ABSTRACT

An instrument panel assembly for a passenger vehicle is provided with a protective film. The protective film has only one unfolded layer. The film layer is sized to cover an opening in an instrument panel. The opening is sized for an airbag to deploy through. The film layer is provided with a slit for separating into portions. The portions extend through the instrument panel as the airbag deploys. The protective film prevents the airbag from being damaged. The film layer also prevents the airbag from damaging the instrument panel. The instrument panel may be provided with a door for selectively covering the opening. The instrument panel assembly may include a hinge for pivotally connecting the door to the instrument panel.

20 Claims, 4 Drawing Sheets

PROTECTIVE LAYER FOR AN AIRBAG ASSEMBLY

BACKGROUND

1. Technical Field

Embodiments of the invention relate to airbags for use in instrument panels in passenger vehicles.

2. Background Art

The prior art has provided passenger vehicles having airbag assemblies for use in instrument panels. During an impact condition, the airbag is deployed for cushioning an occupant thereby enhancing safety. One prior art instrument panel includes a rectangular opening having two hinged doors to cover the opening. The hinged doors are arranged to pivot from the instrument panel as an airbag deploys, forcing the doors outward. The prior art instrument panel includes two pieces of film of thermoplastic olefin (TPO) to prevent the airbag from contacting the hinges during deployment. The prior art instrument panel also includes two pieces of film of biaxially oriented polyethylene terephthalate polyester, each positioned to prevent the airbag from contacting the sides of the opening not adjacent to the TPO.

One prior art instrument panel includes a substrate, a layer of foam, and a layer of skin. The foam layer is disposed atop the substrate and the skin layer is disposed atop the foam layer. A laser is used to bore into the substrate and foam layer to cut an opening. A tear seam is also cut in the skin layer using a laser. As the airbag deploys, the airbag forces the doors to pivot outward, tearing the tear seam to allow the airbag to deploy into an interior compartment of the passenger vehicle.

SUMMARY

One embodiment of the present invention discloses a protective film for an airbag assembly. The film has only one unfolded layer sized to cover an opening in an instrument panel. The film layer includes a slit to separate the film into a plurality of portions. Each portion is adjacent to an edge of the opening. During airbag deployment, the film layer portions extend through the instrument panel opening to prevent the airbag from contacting the instrument panel.

A further embodiment of the invention discloses that the plurality of portions include four flaps. Each flap is sized to be at least as long as the corresponding edge of the opening.

Another further embodiment discloses that the film layer is formed of biaxially oriented polyethylene terephthalate polyester.

An even further embodiment discloses that the layer is sized so that the portions can slide relative to the airbag when forced to deployed positions during airbag deployment.

A still further embodiment of the invention discloses an airbag assembly for an instrument panel of a vehicle. The airbag includes an airbag chute that is positioned on an underside of the instrument panel. The airbag chute is aligned with the opening in the instrument panel.

Yet a further embodiment of the invention discloses that the airbag is stored in the airbag chute for deployment in response to an impact condition.

A further embodiment of the invention discloses the instrument panel assembly having an instrument panel substrate with an opening.

A still further embodiment of the invention discloses the instrument panel assembly having a foam layer disposed upon an outboard surface of the substrate. A skin layer is disposed upon an outboard surface of the foam layer. The instrument panel opening is cut through the substrate and partially into an underside of the foam layer.

Yet another embodiment of the invention discloses that the skin layer includes a tear seam aligned with the opening. When the airbag is deployed, the airbag tears the tear seam.

Another embodiment of the invention discloses that the tear seam includes a plurality of perforations.

Still another embodiment of the invention discloses that the skin layer is formed of a thermoplastic polymer.

A further embodiment discloses that the skin layer is formed from a polyvinyl chloride material.

Yet a further embodiment of the invention discloses the instrument panel assembly including a metal door aligned with the opening and affixed to the substrate. During airbag deployment, the airbag forces the metal door through the opening.

Still a further embodiment of the invention discloses the instrument panel having a hinge. The hinge connects the door to the instrument panel. The hinge allows the door to pivot relative to the instrument panel.

Yet a further embodiment of the invention discloses the instrument panel including a metal plate. The metal plate connects the hinge to the instrument panel.

A further embodiment of the invention discloses that the metal plate is steel.

Another embodiment of the invention discloses the instrument panel having at least two mounting posts. The film layer has at least two corresponding mounting apertures. The mounting apertures receive the mounting posts. Cooperation of the mounting posts and mounting apertures positions the unfolded protective film layer relative to the airbag chute and opening.

Still another embodiment of the invention discloses the airbag chute including at least two positioning apertures. The positioning apertures receive the mounting posts. Cooperation of the mounting posts, mounting apertures, and positioning apertures positions the airbag chute and film layer relative to the door.

A further embodiment includes an airbag stored in the airbag chute to deploy through the instrument panel opening during an impact condition.

Yet a further embodiment of the invention discloses the substrate being formed from a styrene maleic anhydride.

DETAILED DESCRIPTION

As required, detailed embodiments of the present invention are disclosed herein; however, it is to be understood that the disclosed embodiments are merely exemplary of the invention and may be embodied in various and alternative forms. The Figures are not necessarily to scale; some features may be exaggerated or minimized to show details of particular components. Therefore, specific structural and functional details disclosed herein are not to be interpreted as limiting but merely as a representative basis for the claims and/or as a representative basis for teaching one skilled in the art to variously employ the present invention.

Figure 1:
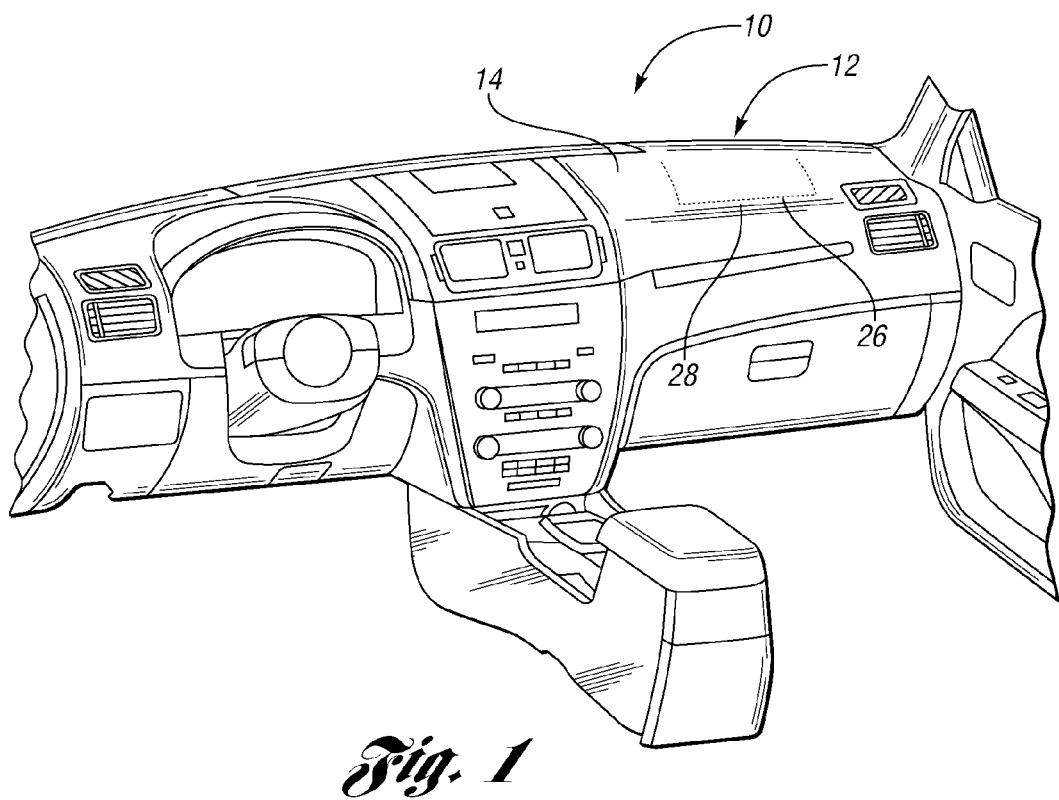
FIG. 1 is a perspective view of an interior of a passenger vehicle having an instrument panel assembly according to an embodiment of the present invention.

Referring now to FIG. 1, an interior of a passenger vehicle is partially illustrated and referenced generally by the numeral 10. The interior 10 is provided with an instrument panel assembly 12 according to one embodiment. The instrument panel assembly 12 includes an instrument panel 14.

Figure 2:
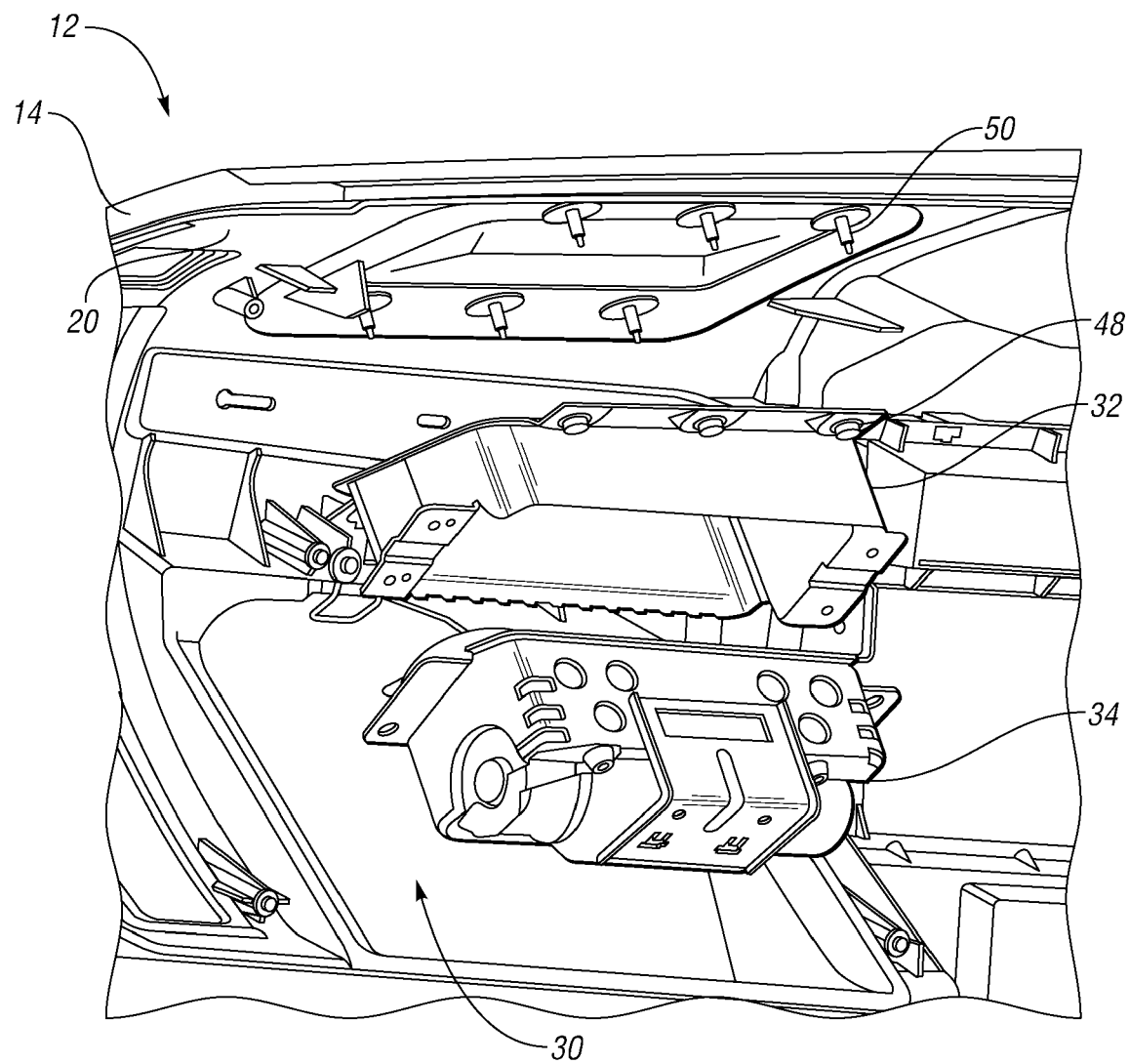
FIG. 2 is an exploded perspective view of the instrument panel assembly of FIG. 1 depicting an airbag assembly according to another embodiment.

Referring to FIG. 2, an airbag assembly 30 is partially illustrated. The airbag assembly 30 includes an airbag chute 32. An airbag 34 is housed within the airbag chute 32. The airbag 34 is configured to deploy from the airbag chute 32.

Figure 3:
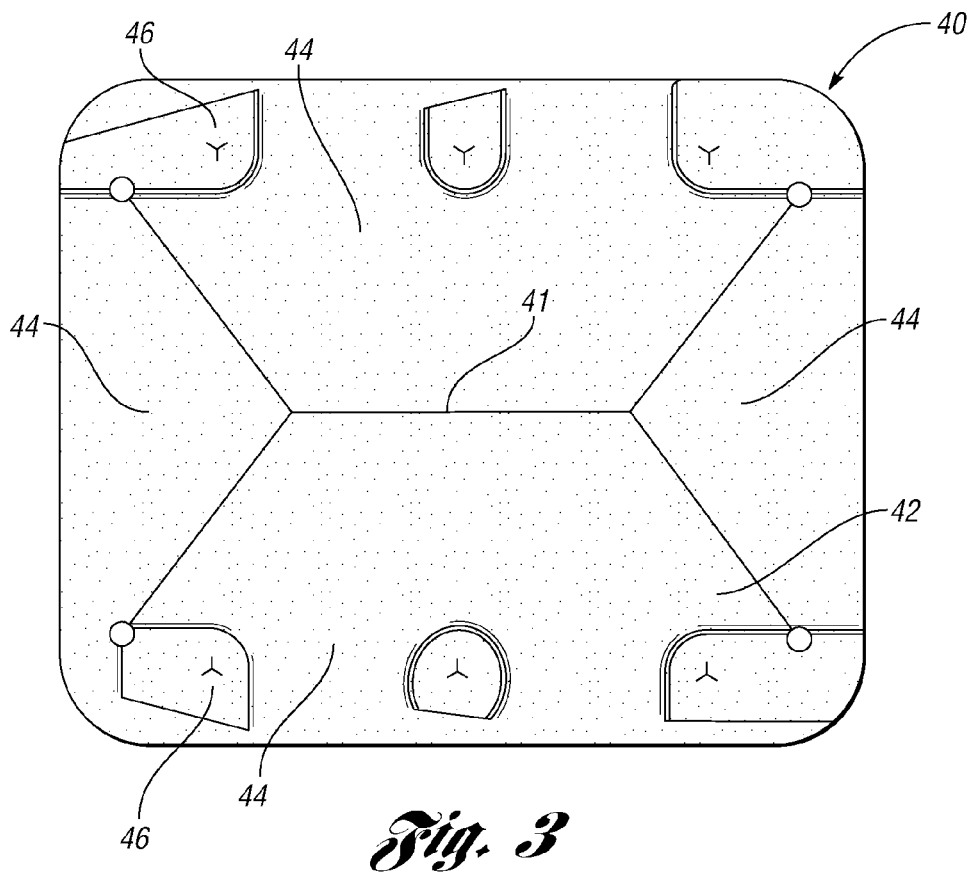
FIG. 3 is an enlarged top plan view of a protective film for cooperation with the airbag assembly and instrument panel assembly of FIG. 2.

Referring to FIG. 3, a protective film 40 for cooperating with the airbag assembly 30 is illustrated. The film 40 is positioned between the airbag assembly 30 and the instrument panel 14. The protective film 40 is configured so that when the airbag 34 deploys from the airbag chute 32 the airbag 34 contacts the protective film 40 before passing through the instrument panel 14.

Figure 4:
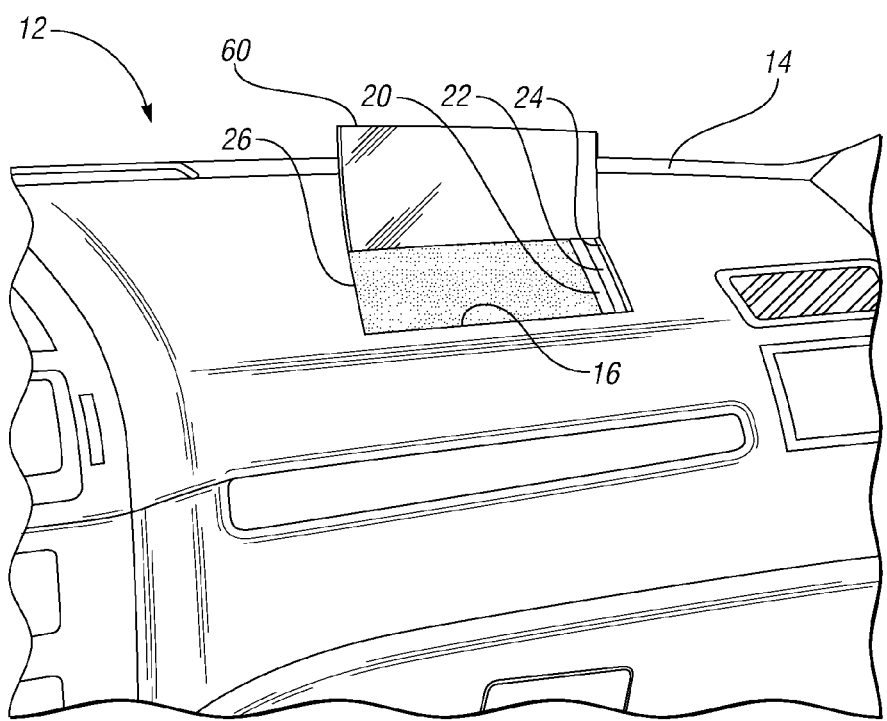
FIG. 4 is an enlarged perspective view of the protective film, airbag assembly, and instrument panel assembly of FIGS. 1-3 illustrating a door in a deployed position according to another embodiment.

Referring to FIG. 4, the instrument panel 14 includes an opening 16. In one embodiment, the opening 16 is cut from the instrument panel 14. The opening 16 is sized for the airbag 34 to deploy through the instrument panel 14. The opening 16 has a peripheral edge 18.

With reference again to FIG. 4, the instrument panel assembly 12 is depicted with a door 60 in a deployed position. The instrument panel 14 includes a substrate 20. The opening 16 is cut through the substrate 20. The substrate 20 may be formed of styrene maleic anhydride, also known as SMA. In an embodiment, the substrate 20 is formed of injection molded SMA. The instrument panel 14 may also include a layer of foam 22. The foam layer 22 is disposed on an outboard side of the substrate 20. In one embodiment, the opening 16 is also cut partially into an underside of the foam layer 22.

The instrument panel 14 may also include a skin layer 24 formed of a thermoplastic polymer. One suitable polymer is a polyvinyl chloride material (PVC). One suitable method for fabricating the skin layer 24 is slush molding. The skin layer 24 may include a tear seam 26. The tear seam 26 includes perforations 28. One method for producing a suitable tear seam 26 includes a laser scoring process. To produce the laser scored tear seam 26, a laser bores thousands of cones through the substrate 20, foam layer 22, and skin layer 24. The depth of the cones may be controlled using an optical sensor. By varying the distance between cones and the depth of the cones, various patterns may be produced. The tear seam 26 is configured so that during airbag deployment the airbag 34 forces the substrate 20, foam layer 22 and skin layer 24 outward tearing the foam layer 22 and the skin layer 24 along the perforations 28. Of course, other suitable methods for producing the tear seam 26 are contemplated, such as utilization of an ultrasonic knife.

In the depicted embodiment, the opening 16 is generally rectangular. The rectangular opening 16 has four sides with corresponding edges 18. Three of the edges 18 correspond to the tear seam 26 in the skin layer 24. During airbag deployment, the airbag 34 forces the skin layer 24 outward tearing the tear seam 26 along the three edges 18. Thus, the segment of the skin layer 24 corresponding to the opening 16 remains attached to the instrument panel assembly 12.

With reference again to FIG. 3, the protective film 40 is illustrated. The protective film 40 has only one layer. The film layer 40 is disposed between the airbag assembly 30 and the instrument panel 14. The film layer 40 is positioned to correspond to the opening 16. The film layer 40 is sized to be larger than the opening 16. In one embodiment, the film layer 40 is spaced apart from the opening 16. The film layer 40 also may be sized to be larger than the airbag chute 32. Prior to airbag deployment, the film layer 40 is unfolded. In one embodiment, the film layer 40 is provided with a slit 41. The slit 41 is arranged in the film layer 40 to divide the film layer 40 into four portions 42. As the airbag 34 deploys, the portions 42 are forced outward to form four flaps 44. Each of the four flaps 44 corresponds to an edge 18 of the opening 16. Each of the flaps 44 is sized to be at least as long as the corresponding edge 18 of the opening 16. Each of the flaps 44 is configured to be positioned between the deployed airbag 34 and the edge 18 of the opening 16. When the airbag 34 is deployed, the airbag 34 forces each of the film layer portions 42 outward. The flaps 44 prevent the airbag 34 from contacting the edges 18 of the opening 16. This prevents the airbag 34 from frictional contact with the substrate 20 or foam layer 22. Additionally, each of the flaps 44 is sized to extend through the instrument panel 14 during airbag deployment.

With further reference to FIG. 3, the protective film 40 may be provided with mounting apertures 46. In one embodiment, the protective film 40 is provided with six mounting apertures 46. Two linear arrays of three mounting apertures 46 are positioned adjacent opposite edges 18 of the protective layer 40. The mounting apertures 46 may be arranged symmetrically. In the depicted embodiment, the protective layer 40 is sized such that the mounting apertures 46 may be positioned so that when the protective layer 40 is disposed between the airbag chute 32 and the instrument panel opening 16, the mounting apertures 46 are not in the path of the deployment of the airbag 34. The mounting apertures 46 may correspond to a corresponding number of positioning apertures 48 (FIG. 2) in the airbag chute 32 or in the instrument panel 14. The mounting apertures 46 and the positioning apertures 48 are sized to receive a corresponding number of mounting posts 50. The mounting posts 50 may be attached to the airbag chute 32 or the instrument panel 14. In the depicted embodiment the positioning apertures 48 are defined by the airbag chute 32 and the mounting posts 50 are attached to an underside of the instrument panel 14. The mounting apertures 46, mounting posts 50, and positioning apertures 48 cooperate to position the film layer 40 to cover the opening 16 and the airbag chute 32. In the depicted embodiment, the mounting apertures 46 and mounting posts 50 are configured to position the film layer 40 such that during airbag deployment each of the flaps 44 is positioned between the airbag 34 and the edge 18 of the opening 16

The protective film 40 is preferably a polyester film. One suitable polyester film is a biaxially oriented polyethylene terephthalate (boPET). The film layer 40 allows the airbag 34 to slide along the film 40 to reduce frictional wear on the airbag 34 from contact between the airbag 34 and the instrument panel 14. Similarly, the film 40 reduces frictional wear on the instrument panel 14 because the film 40 engages the substrate 20, the foam layer 22, and the skin layer 24.

With reference to FIGS. 4-7, the door 60 is sized to generally correspond to the size of the opening 16. In one embodiment, the door 60 is made of a metal, such as steel. The door 60 may be attached to the underside of the substrate 20. In one embodiment, the door 60 generally corresponds to the opening 16 and is disposed between the substrate 20 and the film layer 40. Thus, during airbag deployment, the airbag 34 forces the film layer 40 outward so that the film layer 40 contacts the door 60. The door 60 is forced outward tearing the tear seam 26.

Figure 5:
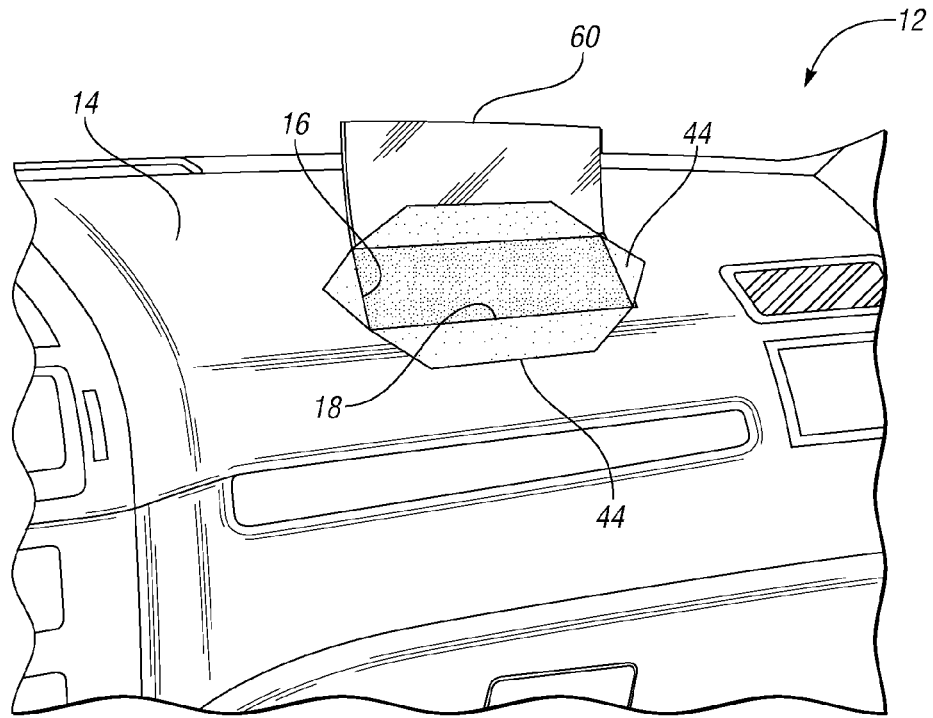
FIG. 5 is an enlarged perspective view of the protective film, airbag assembly, and instrument panel assembly of FIGS. 1-3 illustrating the door and film deployed.

FIG. 5 illustrates the instrument panel 14 having the opening 16 and the protective film 40. The opening 16 and protective film 40 are illustrated in a position corresponding to airbag deployment. The airbag 34 is omitted for clarity of the orientation of the film 40.

Figure 6:
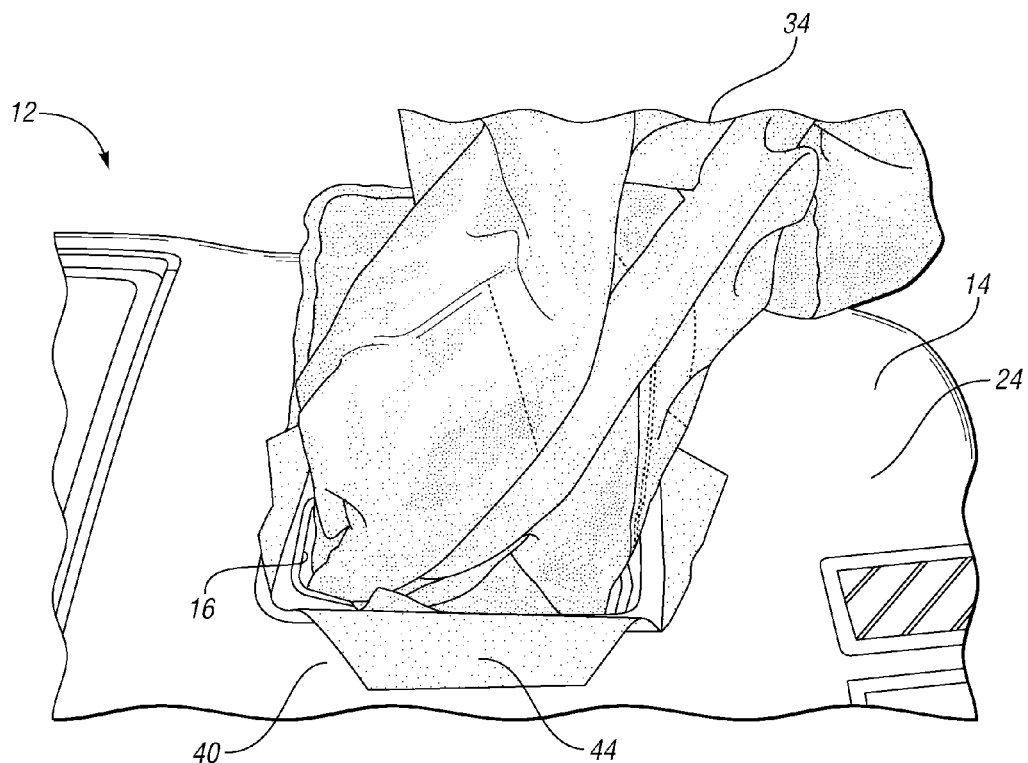
FIG. 6 is an enlarged perspective view of the protective film, airbag assembly, and instrument panel assembly of FIGS. 1-3 illustrating the door, film, and airbag deployed.

With reference to FIG. 6, the instrument panel assembly 12 is illustrated with the airbag 34 deployed. The opening 16 and protective film 40 are illustrated in the airbag-deployed position.

Figure 7:
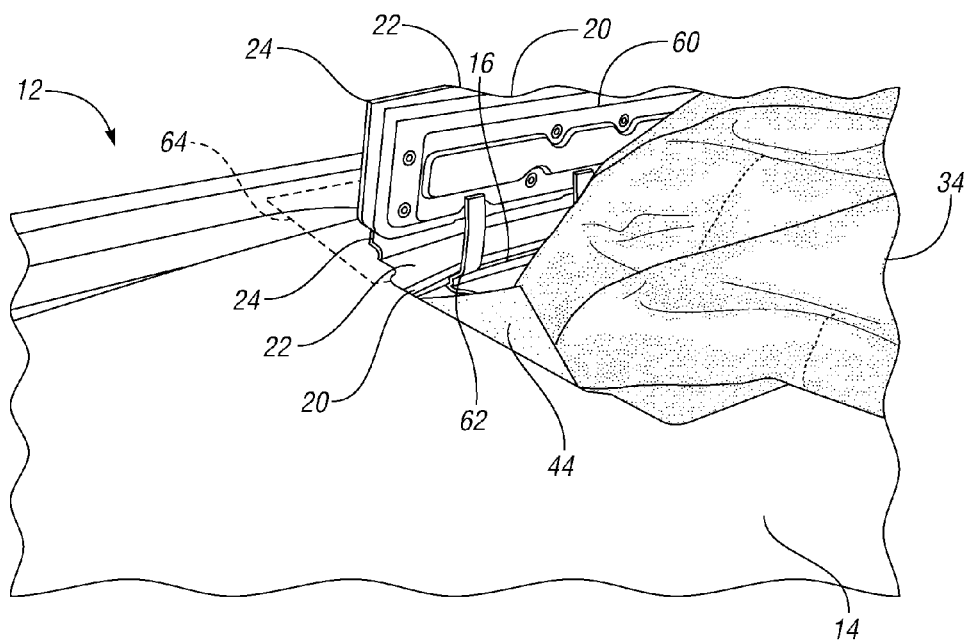
FIG. 7 is an enlarged perspective view of the protective film, airbag assembly, instrument panel, and door of FIGS. 1-3 illustrating a metal plate and a hinge according to another embodiment.

Referring to FIG. 7, the instrument panel assembly 12 is illustrated with the airbag 34 deployed. The door 60 is positioned to be forced open during deployment. The door 60 is pivotally connected to the instrument panel assembly 12 by a hinge 62. The hinge 62 is supported by a metal plate 64. The plate 64 is housed within the instrument panel assembly 12.

The door 60 is hinged along the edge 18 of the opening 16 which does not correspond to the perforations 28 of the tear seam 26. Thus, when the door 60 is forced outward by deployment of the airbag 34, the door 60, substrate 20, foam layer 22 and skin layer 24 are all connected with the instrument panel 14. In the depicted embodiment, the instrument panel 14 includes the metal plate 64 contacting the substrate 20. The metal plate 64 is configured to support the hinge 62. In one embodiment, the metal plate 64 is a steel plate. The steel plate 64 is positioned such that the substrate 20 separates the steel plate 64 from the airbag assembly 30. The hinge 62 is attached to the steel plate 64. The hinge 62 is preferably configured to allow the door 60 to pivot about the hinge 62. Thus, the hinge 62 allows the door 60 to pivot relative to the instrument panel 14. The door 60 is depicted as a U-type door 60, such that when the door 60 is in the deployed position, the edges 18 of the opening 16 not corresponding to the hinge 62 are generally U-shaped. The invention contemplates doors of varying shapes and configurations.

With reference again to FIG. 6, the deployed positions of the protective layer 40, airbag 34 and door 60 are illustrated with reference to airbag deployment. The airbag deployment is in response to a representative vehicle crash. The airbag 34 has deployed in response to an impact condition. The airbag 34 has deployed from the airbag chute 32 through the protective layer 40, forcing the portions 42 outward to form four flaps 44. Each of the flaps 44 is sized to be at least as long as the corresponding edge 18 of the opening 16. Each of the flaps 44 is disposed between the deployed airbag 34 and the edge 18 of the opening 16. One of the flaps 44 further prevents the airbag 34 from engaging the door 60. The door 60 has been forced to pivot along the hinge 62 by the deployment of the airbag 34. The door 60 has been forced outward, tearing the tear seam 26 and separating the substrate 20, the foam layer 22, and the skin layer 24 corresponding to the edge 18 of the opening 16. Of course other components may be provided in the airbag assembly 30. The film 40 provides the interface with the airbag 34 to prevent contact between the airbag 34 and any other components of the instrument panel assembly 12 or airbag assembly 30 to prevent damage to the airbag 34, and any components of the instrument panel assembly 12 or airbag assembly 30.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed:

1. A protective film for an airbag assembly, comprising only one unfolded layer sized to cover an opening in an instrument panel before deployment of an airbag, the film layer having a slit provided through the layer to separate the film layer into a plurality of portions, each portion being adjacent to an edge of the opening to extend through the instrument panel opening during deployment of the airbag for preventing contact with the instrument panel.

2. The film of claim 1, wherein the plurality of portions further comprise four flaps each being sized at least as long as the corresponding edge of the opening for extending through the instrument panel.

3. The film of claim 1, wherein the unfolded layer is formed of biaxially oriented polyethylene terephthalate polyester.

4. The film of claim 1, wherein the layer is sized so that the portions can slide relative to the airbag as the airbag forces the portions to deployed positions during airbag deployment.

5. An airbag assembly for an instrument panel of a vehicle, the airbag assembly comprising:
an airbag chute adapted to be affixed to an underside of an instrument panel aligned with an opening formed in the instrument panel; and
a protective film according to claim 1.

6. The airbag assembly of claim 5, further comprising an airbag stored in the airbag chute to deploy from the chute through the opening in response to an impact condition.

7. An instrument panel assembly for a vehicle, the instrument panel assembly comprising:
an instrument panel substrate having an opening;
an airbag chute affixed to an underside of the instrument panel aligned with the opening for deploying therethrough;
a protective film having only one unfolded layer, the film being sized to cover the opening, the film having a slit provided therethrough to separate the film into a plurality of portions, each portion being adjacent to an edge of the opening to extend through the opening during airbag deployment for preventing the airbag from contacting the instrument panel;
a metal door aligned with the opening and affixed to the substrate to be forced through the opening during airbag deployment;
a hinge connecting the door to the instrument panel for pivoting the door relative to the instrument panel; and
a metal plate connecting the hinge to the instrument panel.

8. The instrument panel assembly of claim 7 further comprising:
a foam layer displaced upon an outboard surface of the substrate; and
a skin layer disposed upon an outboard surface of the foam layer;
wherein the opening is cut through the substrate and partially into an underside of the foam layer.

9. The instrument panel assembly of claim 8, wherein the skin layer has a tear seam aligned with the opening such that when the airbag is deployed, the airbag tears the tear seam.

10. The instrument panel assembly of claim 9, wherein the tear seam is further defined as a plurality of perforations.

11. The instrument panel assembly of claim 8, wherein the skin layer is formed of a thermoplastic polymer.

12. The instrument panel assembly of claim 8, wherein the skin layer is formed of a polyvinyl chloride material.

13. The instrument panel assembly of claim 7, wherein the plate is formed of steel.

14. The instrument panel assembly of claim 7 further comprising at least two mounting posts, and the film further includes at least two corresponding mounting apertures each receiving one of the at least two mounting posts for positioning the protective film between the airbag chute and the opening.

15. The instrument panel assembly of claim 14, wherein the airbag chute includes at least two positioning apertures, each receiving one of the at least two mounting posts to position the airbag chute and the film relative to the door when the at least two mounting posts are received by the at least two positioning apertures.

16. The instrument panel assembly of claim 7, further comprising an airbag stored in the airbag chute to deploy from the chute through the instrument panel opening in response to an impact condition.

17. The instrument panel assembly of claim 7, wherein the substrate is formed from a styrene maleic anhydride.

18. The instrument panel of claim 7 wherein the unfolded layer of the protective film is unfolded before airbag deployment.

19. An instrument panel assembly for a vehicle, the instrument panel assembly comprising:
   an instrument panel substrate having an opening;
   an airbag chute affixed to an underside of the instrument panel aligned with the opening for deploying therethrough;
   at least two mounting posts; and
   a protective film having only one unfolded layer, the film being sized to cover the opening, the film having a slit provided therethrough to separate the film into a plurality of portions, each portion being adjacent to an edge of the opening to extend through the opening during airbag deployment for preventing the airbag from contacting the instrument panel, the film including at least two corresponding mounting apertures each receiving one of the at least two mounting posts for positioning the protective film between the airbag chute and the opening.

20. The instrument panel assembly of claim 19, wherein the airbag chute includes at least two positioning apertures, each receiving one of the at least two mounting posts to position the airbag chute and the film relative to the door when the at least two mounting posts are received by the at least two positioning apertures.

* * * * *